United States Patent Office 3,221,017
Patented Nov. 30, 1965

3,221,017
ARALKOXYAMIDES OF 4-PHENYL-1,2,5,6-TETRA-HYDROPYRIDINO ALKANOIC ACIDS AND INTERMEDIATES THEREOF
John H. Biel, Milwaukee, Wis., assignor to Aldrich Chemical Company, Inc., Milwaukee, Wis., a corporation of Wisconsin
No Drawing. Filed Apr. 7, 1964, Ser. No. 358,070
11 Claims. (Cl. 260—295)

This invention relates to novel 4-arylpyridines. More particularly, this invention relates to aralkoxyamides of 4-phenyl-1,2,5,6-tetrahydropyridino alkanoic acids and a process for the preparation thereof. In a further aspect, this invention relates to novel intermediates useful in processes for preparing the novel 4-arylpyridines of this invention.

In accordance with the present invention, there is provided a member selected from the group consisting of 4-arylpyridines of the formula (I)

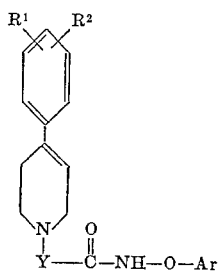

wherein:

$R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive, Y is a (lower)alkylene radical, and Ar is a member selected from the group consisting of radicals of the formulae (II)

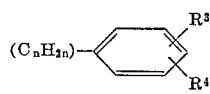

and (III)

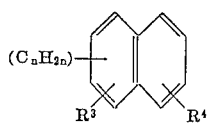

wherein:

$n$ is a whole integer from 1 to 6 inclusive, $R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive;

and the pharmaceutically acceptable nontoxic salts thereof.

Among the radicals represented by $R^1$, $R^2$, $R^3$ and $R^4$, hydrogen, chloro, bromo, iodo, fluoro, trifluoromethyl, nitro, (lower)alkyl, (lower)alkoxy, (lower)alkylthio, (lower)alkanoyl, phenyl, phenoxy and benzyl are preferred. Preferably, $R^1$ or $R^2$ and $R^3$ or $R^4$ are hydrogen, and usually, $R^1$, $R^2$, $R^3$ and $R^4$ are all hydrogen.

The pharmaceutically acceptable nontoxic salts include the organic and inorganic acid addition salts, e.g., those prepared from acids such as hydrochloric, sulfuric, sulfamic, tartaric, hydrobromic, hydriodic, glycolic, citric, maleic, phosphoric, succinic, acetic and the like.

The term "(lower)alkyl" as used herein means both straight and branched chain aliphatic hydrocarbon radicals having from 1 to 8 carbon atoms such as methyl, ethyl, propyl, isopropyl, butyl, isobutyl, t-butyl, amyl, hexyl, 2-ethylhexyl, etc.

Similarly, where the term "(lower)" is used as part of the description of another group, e.g., "(lower)alkoxy," it refers to the alkyl portion of such group which is therefore as described in connection with "(lower)alkyl."

The meaning of the term "(lower)alkylene" is similar to that of "(lower)alkyl" in that it also means both straight and branched chain aliphatic hydrocarbon radicals having from 1 to 8 carbon atoms. Examples of "(lower)alkylene" radicals are methylene, ethylene, propylene, isopropylene, butylene, isobutylene, t-butylene, amylene, hexylene, 2-ethylhexylene, and the like.

The compounds of the present invention produce a potent and prolonged blood pressure lowering which makes them useful in the treatment of hypertension and peripheral vascular disease. Their mechanism of action does not involve blockage of autonomic ganglia. The absence of peripheral and autonomic blocking properties results in a minimum of side effects when these compounds are used as antihypertension agents. Hence, these compounds are particularly suited for the chronic treatment of hypertensive illness. The compounds exhibit low acute toxicity [$LD_{50}$ of N-benzyloxy-$\beta$-(4-phenyl-1,2,5,6-tetrahydropyridino)propionamide administered intraperitoneally to mice is 650 mg./kg.] and high antihypertensive potency [0.5–1.0 mg./kg. of N-benzyloxy-$\beta$-(4-phenyl-1,2,5,6-tetrahydropyridino)propionamide produced hypotensive activity in a dog for 3 hours] making them valuable therapeutic agents. When N-benzyloxy-$\beta$-(4-phenyl-1,2,5,6-tetrahydropyridino)propionamide was administered at dosages of 100 mgm./kg. orally in rats a 28% reduction in arterial blood pressure was obtained. In addition, the compounds, being tertiary bases, can be used to recover and purify penicillins with which they form salts.

The compounds of the present invention are prepared by the following series of steps:

(1) An aralkoxyamine of the formula $$Ar-O-NH_2$$

wherein Ar is as represented above, is reacted with an equimolar quantity of a halo or tosyl acid chloride of the formula

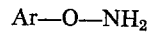

wherein A is a radical selected from the group consisting of chloro, bromo, iodo and tosyl, and Y is as represented above according to the method described in United States Patent No. 2,569,288.

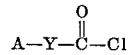

wherein A, Ar and Y are as previously defined. The product, an N-aralkoxy halo or tosylalkanoic acid amide, is a novel intermediate, useful in the second step for the preparation of the 4-arylpyridines of Formula I, and is considered within the scope of this invention.

(2) The N-aralkoxy halo or tosylalkanoic acid amide prepared in Step 1 is then reacted with an equimolar quantity of a 1,2,5,6-tetrahydropyridine of the formula

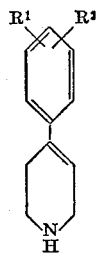

wherein $R^1$ and $R^2$ are as described above, in the presence of triethylamine and dimethylformamide, and a trace of potassium iodide at elevated temperature, i.e., 65–70° C., for several hours according to the procedure described in United States Patent No. 2,929,818. The cooled reaction mixture is then poured into water containing an equimolar amount of sodium hydroxide. The free base is collected by filtration and dried.

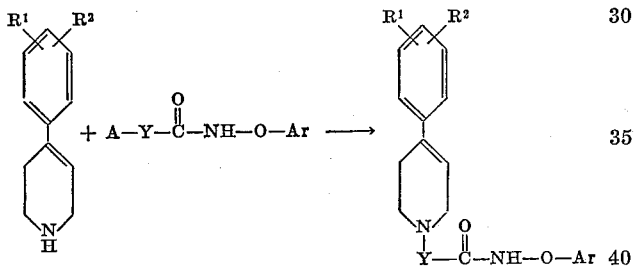

wherein A, $R^1$, $R^2$, Y and Ar are as defined above.

The free base may be readily converted, if desired, to a nontoxic acid addition salt by conventional procedures.

An alternate procedure for preparing the compounds of the invention comprises the addition of the 1,2,5,6-tetrahydropyridine to an acrylic acid amide or a substituted acid amide in the presence of a strong base, e.g., sodium hydroxide, according to the equation

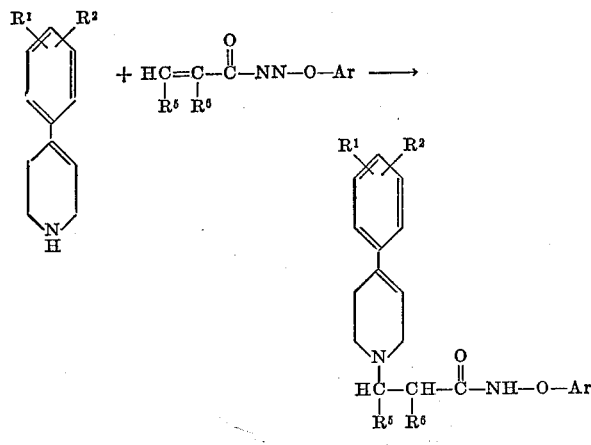

wherein $R^1$, $R^2$ and Ar are as represented above, and $R^5$ and $R^6$ are each hydrogen or (lower) alkyl.

A third procedure by which the compounds can be prepared involves the reaction of a halo or tosylalkanoic acid ester with the 1,2,5,6-tetrahydropyridine and subsequent conversion to the amide

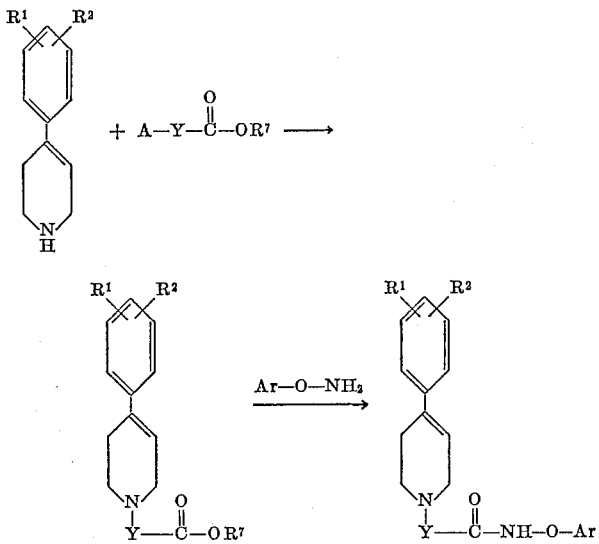

wherein A, Ar, $R^1$, $R^2$ and Y are as described above, and $R^7$ is methyl, ethyl, p-nitrophenyl, cyanomethyl, succinimido, phthalimido, and $OR^7$ may also be chloro or bromo.

In each of the three methods for the preparation of the compounds of this invention, the 1,2,5,6-tetrahydropyridine and other reactants are brought together in a suitable medium such as dimethylformamide, ethanol, isopropyl alcohol, toluene, xylene, dimethoxyethane, diethyleneglycol and heated at 50–100° C. for several hours in the presence of a base such as triethylamine, aminopyrine, diethylaniline, potassium carbonate and triethyl phenyl ammonium hydroxide. The cooled reaction mixture is then poured into dilute sodium hydroxide. The basic amide or ester precipitates either as a water insoluble oil or a crystalline solid and is extracted with such solvents as methylene dichloride, chloroform, carbon tetrachloride or by filtration of the solid product. In the case of the third procedure, the ester that is obtained is reacted with aralkoxyamine, or a substituted aralkoxyamine; the product is then converted to a nontoxic acid addition salt.

It is obvious that in some cases, the radicals attached to the aromatic ring, e.g., the amino radical, will interefere with the reactions used in preparing the compounds of this invention. Therefore, it is necessary to block the reactive radicals before proceeding with the reactions. This is conveniently accomplished by methods known in the art. For example, in the case of an amino substituted aromatic ring, the amino group is blocked by forming the Schiff's base by reacting the aromatic amine with an aldehyde such as acetaldehyde, and after all reactions have been completed, the Schiff's base may be cleaved with dilute hydrochloric acid to regenerate the free amino group.

The starting materials used in the processes described herein are compounds which are either commercially available, well known in the prior art, or easily prepared in accordance with standard organic procedures previously described in the chemical literature.

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The following examples are intended to illustrate the invention described herein without unduly restricting it.

EXAMPLE 1

*Preparation of N-benzyloxy-β-chloropropionamide*

Benzyloxyamine (10 gm., 0.081 mole) slurried in water (50 ml.), is stirred and cooled to 0° C. To this mixture is added β-chloropropionyl chloride (10.2 gm., 0.081 mole) and a sodium hydroxide solution (4 gm., NaOH in 8 ml. of water) slowly over 20 minutes, and keeping the temperature between 0° and 5° C. The mixture is stirred for one-half hour, and filtered. The white residue is washed once with water (neutral to pH paper) and dried in vacuo at 37° C. The white solid has a melting point of 85–89° C.

Recrystallization from methanol yields 10.2 gm. of N-benzyloxy-β-chloropropionamide having a melting point of 87–89° C.

EXAMPLE 2

In the procedure of Example 1, benzyloxyamine is replaced by 0.081 mole of

β-naphthylmethyloxyamine,
α-Naphthylmethyloxyamine,
3-chlorobenzyloxyamine,
3-hydroxy-4-chlorobenzyloxyamine,
3-methoxybenzyloxyamine,
3-nitrobenzyloxyamine,
3,4-methylenedioxybenzyloxyamine,
2,6-dibromobenzyloxyamine,
3,4-dimethylbenzyloxyamine,
2-bromo-4-hydroxybenzyloxyamine,
2-bromo-3-hydroxybenzyloxyamine,
2,5-dimethoxybenzyloxyamine,
Phenylethyloxyamine,
4-iodobenzyloxyamine,
3-fluorobenzyloxyamine,
4-trifluoromethylbenzylamine,
3-aminobenzyloxyamine,
2-methylaminobenzyloxyamine,
3-dimethylaminobenzyloxyamine,
2-methylbenzyloxyamine,
4-phenylbenzyloxyamine,
3-benzylbenzyloxyamine,
4-phenoxybenzyloxyamine,
4-cyclohexylbenzyloxyamine,
4-cyclopentyloxybenzyloxyamine,
4-sulfamylbenzyloxyamine,
3-acetamidobenzyloxyamine,
4-methylthiobenzyloxyamine,
4-acetylbenzyloxyamine,
3-methylsulfonylbenzyloxyamine,
4-trifluoromethyl-1-naphthylmethyloxyamine and
2,7-dibromo-3-naphthylmethyloxyamine, to produce the following products, N-β-naphthylmethyloxy-β-chloropropionamide,
N-α-naphthylmethyloxy-β-chloropropionamide,
N-(3-chlorobenzyloxy)-β-chloropropionamide,
N(3-hydroxy-4-chlorobenzyloxy)-β-chloropropionamide,
N-(3-methoxybenzyloxy)-β-chloropropionamide,
N-(3-nitrobenzyloxy)-β-chloropropionamide,
N-(3,4-methylenedioxybenzyloxy)-β-chloropropionamide,
N-(2,6-dibromobenzyloxy)-β-chloropropionamide,
N-(3,4-dimethylbenzyloxy)-β-chloropropionamide,
N-(2-bromo-4-hydroxybenzyloxy)-β-chloropropionamide,
N-(2-bromo-3-hydroxybenzyloxy)-β-chloropropionamide,
N-(2,5-dimethoxybenzyloxy)-β-chloropropionamide,
N-phenylethyloxy-β-chloropropionamide,
N-(4-iodobenzyloxy)-β-chloropropionamide,
N-(3-fluorobenzyloxy)-β-chloropropionamide,
N-(4-trifluoromethylbenzyloxy)-β-chloropropionamide,
N-(3-aminobenzyloxy)-β-chloropropionamide,
N-(2-methylaminobenzyloxy)-β-chloropropionamide,
N-(3-dimethylaminobenzyloxy)-β-chloropropionamide,
N-(2-methylbenzyloxy)-β-chloropropionamide,
N-(4-phenylbenzyloxy)-β-chloropropionamide,
N-(3-benzylbenzyloxy)-β-chloropropionamide,
N-(4-phenoxybenzyloxy)-β-chloropropionamide,
N-(4-cyclohexylbenzyloxy)-β-chloropropionamide,
N-(4-cyclopentyloxybenzyloxy)-β-chloropropionamide,
N-(4-sulfamylbenzyloxy)-β-chloropropionamide,
N-(3-acetamidobenzyloxy)-β-chloropropionamide,
N-(4-methylthiobenzyloxy)-β-chloropropionamide,
N-(4-acetylbenzyloxy)-β-chloropropionamide,
N-(3-methylsulfonylbenzyloxy)-β-chloropropionamide,
N-(4-trifluoromethyl-1-naphthylmethyloxy)-β-chloropropionamide and
N-(2,7-dibromo-3-naphthylmethyloxy)-β-chloropropionamide, respectively.

EXAMPLE 3

When, in the procedure of Example 1, the β-chloropropionyl chloride is replaced by 0.081 mole of Chloroacetyl chloride,
α-Chloropropionyl chloride,
γ-Chlorobutyryl chloride,
α-Chloroisobutyryl chloride,
β-Bromopropionyl chloride,
β-Iodopropionyl chloride,
γ-Chlorohexanoyl chloride and
β-Tosylpropionyl chloride, the following compounds are produced, N-benzyloxy-chloroacetamide,
N-benzyloxy-α-chloropropionamide,
N-benzyloxy-γ-chlorobutyramide,
N-benzyloxy-α-chloroisobutyramide,
N-benzyloxy-β-bromopropionamide,
N-benzyloxy-β-iodopropionamide,
N-benzyloxy-γ-chlorohexanoamide and
N-benzyloxy-β-tosylpropionamide, respectively.

EXAMPLE 4

*Preparation of N-benzyloxy-β-(4-phenyl-1,2,5,6-tetrahydropyridino)propionamide*

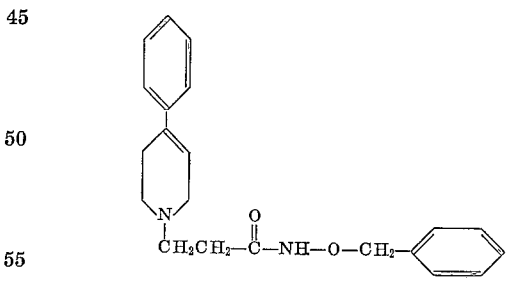

A mixture containing 4-phenyl-1,2,5,6-tetrahydropyridine (0.05 mole), N-benzyloxy-β- chloropropionamide (0.05 mole), triethylamine (0.05 mole) and potassium iodide (100 mg.) in dimethylformamide (30 ml.) is stirred and heated at 65–70° C. for 4 hours. The cooled reaction mixture is poured into water (300 ml.) containing sodium hydroxide (0.05 mole). A solid, N-benzyloxy - β - (4 - phenyl - 1,2,5,6 - tetrahydropyridino) propionamide, forms on standing which is collected by filtration, dried in vacuo at 47° C., and found to weigh 6 gm., and to have a melting point of 100–105° C.

EXAMPLE 5

*Preparation of N-benzyloxy-β-(4-phenyl-1,2,5,6-tetrahydropyridino)propionamide hydrochloride*

The free base, N-benzyloxy-β-(4-phenyl-1,2,5,6-tetrahydropyridino)propionamide, is dissolved in methylene chloride. Hydrogen chloride gas is passed into the methylene chloride solution of the base, and the salt, N-benzyloxy - β - (4 - phenyl - 1,2,5,6 - tetrahydropyridino) propionamide hydrochloride, is collected and dried, and found to have a melting point of 204–208° C.

Recrystallization from methanol yields 5.1 gm. of the white solid, N-benzyloxy-β-(4-phenyl-1,2,5,6-tetrahydropyridino)-propionamide hydrochloride, and is found to have a melting point of 206.5–210.5° C.

EXAMPLE 6

When, in the procedure of Example 4, the 4-phenyl-1,2,5,6-tetrahydropyridine is replaced by an equal molar amount of 4-4-chlorophenyl-1,2,5,6-tetrahydropyridine,
4-4-trifluoromethylphenyl-1,2,5,6-tetrahydropyridine,
4-3-fluorophenyl-1,2,5,6-tetrahydropyridine,
4-2-trifluoromethylphenyl-1,2,5,6-tetrahydropyridine,
4-2-bromophenyl-1,2,5,6-tetrahydropyridine,
4-3-chlorophenyl-1,2,5,6-tetrahydropyridine,
4-2-sulfamylphenyl-1,2,5,6-tetrahydropyridine,
4-3-hydroxyphenyl-1,2,5,6-tetrahydropyridine,
4-4-ethylphenyl-1,2,5,6-tetrahydropyridine,
4-3-methylphenyl-1,2,5,6-tetrahydropyridine,
4-2,4-dimethoxyphenyl-1,2,5,6-tetrahydropyridine,
4-3-methylthiophenyl-1,2,5,6-tetrahydropyridine,
4-2-aminophenyl-1,2,5,6-tetrahydropyridine,
4-2-chlorophenyl-1,2,5,6-tetrahydropyridine,
4-3-trifluoromethylphenyl-1,2,5,6-tetrahydropyridine,
4-3,4-methylenedioxyphenyl-1,2,5,6-tetrahydropyridine,
4-4-methoxyphenyl-1,2,5,6-tetrahydropyridine,
4-2-methylaminophenyl-1,2,5,6-tetrahydropyridine,
4-3-diethylaminophenyl-1,2,5,6-tetrahydropyridine,
4-2-acetylphenyl-1,2,5,6-tetrahydropyridine,
4-4-acetamidophenyl-1,2,5,6-tetrahydropyridine,
4-2-propylthiophenyl-1,2,5,6-tetrahydropyridine,
4-(2-hydroxy-4-nitrophenyl)-1,2,5,6-tetrahydropyridine,
4-4-phenylphenyl-1,2,5,6-tetrahydropyridine,
4-3-benzylphenyl-1,2,5,6-tetrahydropyridine,
4-3-phenoxyphenyl-1,2,5,6-tetrahydropyridine,
4-4-cyclohexylphenyl-1,2,5,6-tetrahydropyridine,
4-4-cycloheptyloxyphenyl-1,2,5,6-tetrahydropyridine,
4-2-iodophenyl-1,2,5,6-tetrahydropyridine,
4-2-methylthiophenyl-1,2,5,6-tetrahydropyridine, and
4-4-ethylsulfonylphenyl-1,2,5,6-tetrahydropyridine, the following compounds are produced, N-benzyloxy-β-[4-(4-chlorophenyl)-1,2,5,6-tetrahydropyridino]-propionamide,
N-benzyloxy-β-[4-(4-trifluoromethylphenyl)-1,2,5,6-tetrahydropyridino]propionamide,
N-benzyloxy-β-[4-(3-fluorophenyl)-1,2,5,6-tetrahydropyridino]-propionamide,
N-benzyloxy-β-[4-(2-trifluoromethylphenyl)-1,2,5,6-tetrahydropyridino]propionamide,
N-benzyloxy-β-[4-(2-bromophenyl)-1,2,5,6-tetrahydropyridino]propionamide,
N-benzloxy-β-[4-(3-chlorophenyl)-1,2,5,6-tetrahydropyridino]proprionamide,
N-benzyloxy-β-[4-(2-sulfamylphenyl)-1,2,5,6-tetrahydropyridino]propionamide,
N-benzyloxy-β-[4-(3-hydroxyphenyl)-1,2,5,6-tetrahydropridino]propionamide,
N-benzyloxy-β-[4-(4-ethylphenyl)-1,2,5,6-tetrahydropyridino]propionamide,
N-benzyloxy-β-[4-(3-methylphenyl)-1,2,5,6-tetrahydropyridino]propionamide,
N-benzyloxy-β-[4-(2,4-dimethoxyphenyl)-1,2,5,6-tetrahydropyridino]propionamide,
N-benzyloxy-β-[4-(3-methylthiophenyl)-1,2,5,6,tetrahydropyridino]propionamide,
N-benzyloxy-β-[4-(2-aminophenyl)-1,2,5,6-tetrahydropyridino]propionamide,
N-benzyloxy-β-]4-(2-chlorophenyl)-1,2,5,6-tetrahydropyridino]propionamide,
N-benzyloxy-β-[4-(3-trifluoromethylphenyl)-1,2,5,6-tetrahydropyridino]propionamide,
N-benzyloxy-β-[4-(3,4-methylenedioxyphenyl)-1,2,5,6-tetrahydropyridino]propionamide,
N-benzyloxy-β-[4-(4-methoxyphenyl)-1,2,5,6-tetrahydropyridino]propionamide,
N-benzyloxy-β-[4-(2-methylaminophenyl)-1,2,5,6-tetrahydropyridino]propionamide,
N-benzyloxy-β-[4-(3-diethylaminophenyl)-1,2,5,6-tetrahydropyridino]propionamide,
N-benzyloxy-β-[4-(2-acetylphenyl)-1,2,4,6-tetrahydropyridino]propionamide,
N-benzyloxy-β-[4-(4-acetamidophenyl)-1,2,5,6-tetrahydropyridino]propionamide,
N-benzyloxy-β-[4-(2-propylthiophenyl)-1,2,5,6-tetrahydropyridino]propionamide,
N-benzyloxy-β-[4-(2-hydroxy-4-nitrophenyl)-1,2,5,6-tetrahydropyridino]propionamide,
N-benzyloxy-β-[4-(2-acetylphenyl)-1,2,5,6-tetrahydropyridino]propionamide,
N-benzyloxy-β-[4-(3-benzylphenyl)-1,2,5,6-tetrahydropyridino]propionamide,
N-benzyloxy-β-[4-(3-phenoxyphenyl)-1,2,5,6-tetrahydropyridino]propionamide,
N-benzyloxy-β-[4-(4-cyclohexylphenyl)-1,2,5,6-tetrahydropyridino]propionamide,
N-benzyloxy-β-[4-(4-cycloheptyloxyphenyl)-1,2,5,6-tetrahydropyridino]propionamide,
N-benzyloxy-β-[4-(2-idophenyl)-1,2,5,6-tetrahydropyridino]propionamide,
N-benzyloxy-β-[4-(2-methylthiophenyl)-1,2,5,6-tetrahydropyridino]propionamide, and
N-benzyloxy-β-[4-(4-ethylsulfonylphenyl)-1,2,5,6-tetrahydropyridino]propionamide, respectively.

EXAMPLE 7

In the procedure of Example 4, N-benzyloxy-β-chloropropionamide is replaced by 0.05 mole of each of the aralkoxy-β-chloropropionamides prepared in Example 2 to produce the following products, N - β - naphthylmethyloxy - β - (4 - phenyl - 1,2,5,6 - tetrahydropyridino)-propionamide,
N - α - naphthylmethyloxy - β - (4 - phenyl - 1,2,5,6-tetrahydropyridino)-propionamide,
N - (3 - chlorobenzyloxy) - β - (4 - phenyl - 1,2,5,6 - tetrahydropyridino)-propionamide,
N - (3 - hydroxy - 4 - chlorobenzyloxy) - β - (4 - phenyl-1,2,5,6-tetrahydropyridino)propionamide,
N - (3 - methoxybenzyloxy) - β - (4 - phenyl - 1,2,5,6-tetrahydropyridino)-propionamide,
N - (3 - nitrobenzyloxy) - β - (4 - phenyl - 1,2,5,6 - tetrahydropyridino)-propionamide,
N - (3,4 - methylenedioxybenzyloxy) - β - (4 - phenyl-1,2,5,6-tetrahydropyridino)propionamide,
N - (2,6 - dibromobenzyloxy) - β - (4 - phenyl - 1,2,5,6-tetrahydropyridino)-propionamide,
N - (3,4 - dimethylbenzyloxy) - β - (4 - phenyl - 1,2,5,6-tetrahydropyridino)-propionamide,
N - (2 - bromo - 4 - hydroxybenzyloxy) - β - (4 - phenyl-1,2,5,6-tetrahydropyridino)propionamide,
N - (2 - bromo - 3 - hydroxybenzyloxy) - β - (4 - phenyl-1,2,5,6-tetrahydropyridino)propionamide,
N - (2,5 - dimethoxybenzyloxy) - β - (4 - phenyl-1,2,5,6-tetrahydropyridino)propionamide,
N - phenylethyloxy - β - (4 - phenyl - 1,2,5,6 - tetrahydropyridino)-propionamide,
N - (4 - iodobenzyloxy) - β - (4 - phenyl - 1,2,5,6 - tetrahydropyridino)-propionamide,
N - (3 - fluorobenzyloxy) - β - (4 - phenyl - 1,2,5,6 - tetrahydropyridino)-propionamide,
N - (4 - trifluoromethylbenzyloxy) - β - (4 - phenyl - 1,2, 5,6-tetrahydropyridino)propionamide,
N - (3 - aminobenzyloxy) - β - (4 - phenyl - 1,2,5,6 - tetrahydropyridino)-propionamide,
N - (2 - methylaminobenzyloxy) - β - (4 - phenyl - 1,2,5, 6-tetrahydropyridino)-propionamide, N - (3 - dimethylaminobenzyloxy) - β - (4 - phenyl - 1,2, 5,6-tetrahydropyridino)propionamide,
N - (2 - methylbenzyloxy) - β - (4 - phenyl - 1,2,5,6 - tetrahydropyridino)-propionamide,
N - (4 - phenylbenzyloxy) - β - (4 - phenyl - 1,2,5,6 - tetrahydropyridino)-propionamide,
N - (3 - benzylbenzyloxy) - β - (4 - phenyl - 1,2,5,6 - tetrahydropyridino)-propionamide,
N - (4 - phenoxybenzyloxy) - β - (4 - phenyl - 1,2,5,6- tetrahydrophyridino)-propionamide,
N - (4 - cyclohexylbenzyloxy) - β - (4 - phenyl - 1,2,5,6- tetrahydropyridino)-propionamide,
N - (4 - cyclopentyloxybenzyloxy) - β - (4 - phenyl- 1,2,5,6-tetrahydropyridino)propionamide,
N - (4 - sulfamylbenzyloxy) - β - (4 - phenyl - 1,2,5,6- tetrahydropyridino)-propionamide,
N - (3 - acetamidobenzyloxy) - β - (4 - phenyl - 1,2,5,6- tetrahydropyridino)-propionamide,
N - (4 - methylthiobenzyloxy) - β - (4 - phenyl - 1,2,5,6- tetrahydropyridino)-propionamide,
N - (4 - acetylbenzyloxy) - β - (4 - phenyl - 1,2,5,6 - tetrahydropyridino)-propionamide,
N - (3 - methylsulfonylbenzyloxy) - β - (4 - phenyl - 1,2, 5,6-tetrahydropyridino)propionamide,
N - (4 - trifluoromethyl - 1- naphthylmethyloxy) - β - (4- phenyl-1,2,5,6-tetrahydropyridino)propionamide and
N - (2,7 - dibromo - 3 - naphthylmethyloxy) - β - (4- phenyl-1,2,5,6-tetrahydropyridino)propionamide,
respectively.

EXAMPLE 8

When, in the procedure of Example 4, N-benzyloxyl-β-chloropropionamide is replaced by an equal molar amount of each of the N-benzyloxy chloro and tosyl alkylamides prepared in Example 3, the following products are produced, N - benzyloxy - (4 - phenyl - 1,2,5,6 - tetrahydropyridino)-acetamide,
N - benzyloxy - α - (4 - phenyl - 1,2,5,6 - tetrahydropyridino)propionamide,
N - benzyloxy - γ - (4 - phenyl - 1,2,5,6 - tetrahydropyridino)butyramide,
N - benzyloxy - β - (4 - phenyl - 1,2,5,6 - tetrahydropyridino)propionamide,
N - benzyloxy - γ - (4 - phenyl - 1,2,5, 6 - tetrahydropyridino)hexanoamide, and

What is claimed is:
1. A compound selected from the group consisting of compounds of the formula

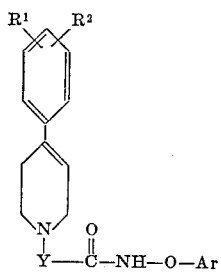

wherein:
R¹ and R² are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsufonyl, methylenedioxy, cycloalkyl radicals having from 5 to 7 carbon atoms inclusive, cycloalkoxy radicals having from 5 to 7 carbon atoms inclusive,
Y is a (lower)alkylene radical, and
Ar is a member selected from the group consisting of radicals of the formulae

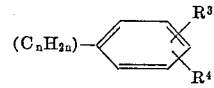

and

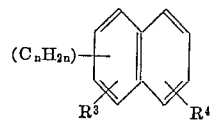

wherein:
n is a whole integer from 1 to 6 inclusive,
R³ and R⁴ are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive;

and the pharmaceutically acceptable nontoxic salts thereof.

2. A compound selected from the group consisting of compounds of the formula

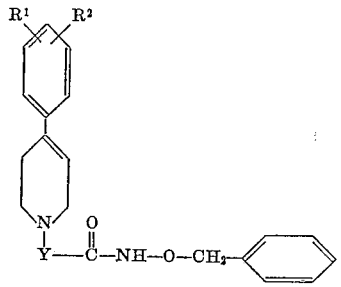

wherein:
R¹ and R² are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, and
Y is a (lower)alkylene radical;

and the pharmaceutically acceptable nontoxic salts thereof.

3. A compound selected from the group consisting of compounds of the formula

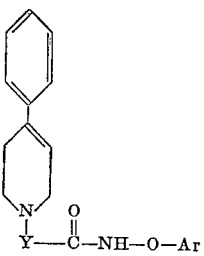

wherein:
Y is a (lower)alkylene radical, and

Ar is a member selected from the group consisting of radicals of the formulae

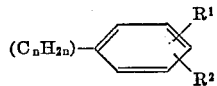

and

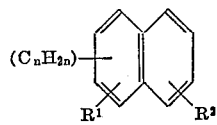

wherein:
n is a whole integer from 1 to 6 inclusive,
R¹ and R² are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive;

and the pharmaceutically acceptable nontoxic salts thereof.

4. A compound selected from the group consisting of compounds of the formula

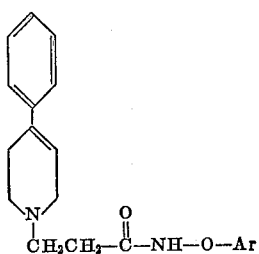

wherein:
Ar is a member selected from the group consisting of radicals of the formulae

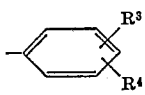

and

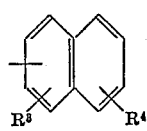

wherein:
R³ and R⁴ are each a member selected from the group consisting of hydrogen, chloro, bromo, iodo, fluoro, trifluoromethyl, amino, nitro, (lower)alkyl, (lower) alkoxy, hydroxy, phenyl, phenoxy, benzyl, (lower) alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive;

and the pharmaceutically acceptable nontoxic salts thereof.

5. A compound of the formula

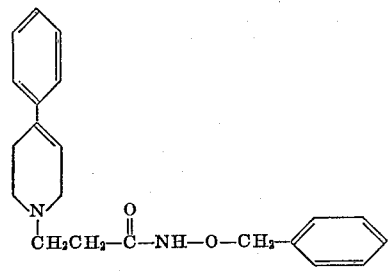

and the pharmaceutically acceptable nontoxic salts thereof.

6. A compound of the formula

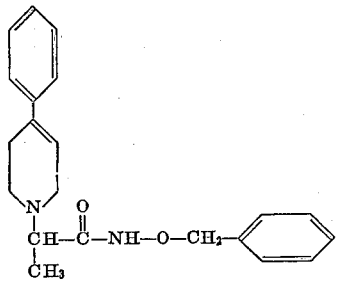

and the pharmaceutically acceptable nontoxic salts thereof.

7. A compound of the formula

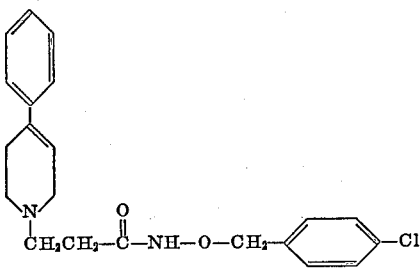

and the pharmaceutically acceptable nontoxic salts thereof.

8. A compound of the formula

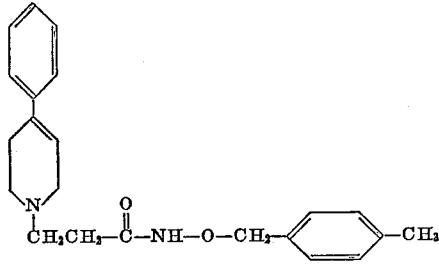

and the pharmaceutically acceptable nontoxic salts thereof.

9. A compound of the formula

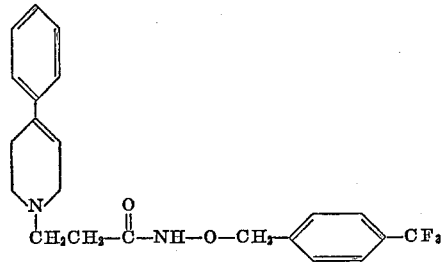

and the pharmaceutically acceptable nontoxic salts thereof.

10. A compound of the formula

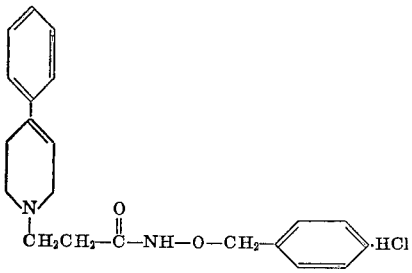

11. Compounds of the formula

wherein:

A is a member selected from the group consisting of chloro, bromo, iodo and tosyl,
Y is a (lower)alkylene radical, and
Ar is a member selected from the group consisting of radicals of the formulae

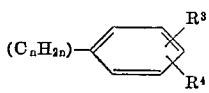

and

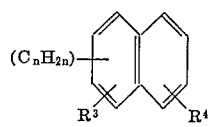

wherein:

$n$ is a whole integer from 1 to 6 inclusive,
$R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive.

References Cited by the Examiner

UNITED STATES PATENTS

| | | | |
|---|---|---|---|
| 2,929,818 | 3/1960 | Janssen et al. | 260—295 |
| 3,072,648 | 1/1963 | Bonvicino | 260—240 |

WALTER A. MODANCE, *Primary Examiner.*